United States Patent [19]

Inciong

[11] Patent Number: 4,625,979
[45] Date of Patent: Dec. 2, 1986

[54] SEAL ASSEMBLY HAVING A LOW EXTRUSION RESISTANT ELASTOMERIC SEALING BEAD

[75] Inventor: Josefino T. Inciong, Des Plaines, Ill.

[73] Assignee: Felt Products Mfg. Co., Skokie, Ill.

[21] Appl. No.: 762,682

[22] Filed: Aug. 5, 1985

[51] Int. Cl.⁴ ............................................. F16J 15/10
[52] U.S. Cl. ..................................... 277/180; 277/227; 277/235 R; 277/235 B
[58] Field of Search ............... 277/235 R, 235 B, 180, 277/227

[56] References Cited

U.S. PATENT DOCUMENTS

| | | | |
|---|---|---|---|
| 3,531,133 | 9/1970 | Sheesley et al. | 277/235 R X |
| 3,565,449 | 2/1971 | Ascencio et al. | 277/235 B |
| 3,794,333 | 2/1974 | Czernik et al. | 277/235 B X |
| 4,095,809 | 6/1978 | Smith | 277/180 |

FOREIGN PATENT DOCUMENTS

| | | | |
|---|---|---|---|
| 2453108 | 5/1975 | Fed. Rep. of Germany | 277/235 R |
| 1134096 | 11/1968 | United Kingdom | 277/180 |

*Primary Examiner*—Allan N. Shoap
*Attorney, Agent, or Firm*—Dressler, Goldsmith, Shore, Sutker & Milnamow, Ltd.

[57] ABSTRACT

A gasket assembly having a gasket member defining an opening therethrough and a substantially flat surface portion around the opening is disclosed herein. A first low extrusion-resistant elastomeric sealing bead is disposed on the flat surface portion of the gasket member circumscribing the opening. A second high extrusion-resistant bead is disposed on the flat surface portion of the gasket member circumscribing the opening and lying closely adjacent to the first sealing bead. A third high extrusion-resistant bead is disposed on the flat surface portion of the gasket member circumscribing the opening and lying closely adjacent to the first sealing bead, the second and third beads straddling the first sealing bead. The first sealing bead has an overall height which is greater than the heights of the second and third beads. When said gasket member is placed under compression, the second and third beads restrict displacement of the first bead to prevent extrusion of the first sealing bead. Preferably, the volumes of the spaces between the first sealing bead and the second and third beads is less than the volume of the first sealing bead which lies above an imaginary line connecting the uppermost edges of the second and third sealing beads so that under compression by a compressing surface, the displacement of the first sealing bead is confined by the second and third beads and the first sealing bead material remains as the primary seal against a compressing surface. A method of making the gasket assembly is also disclosed.

6 Claims, 5 Drawing Figures

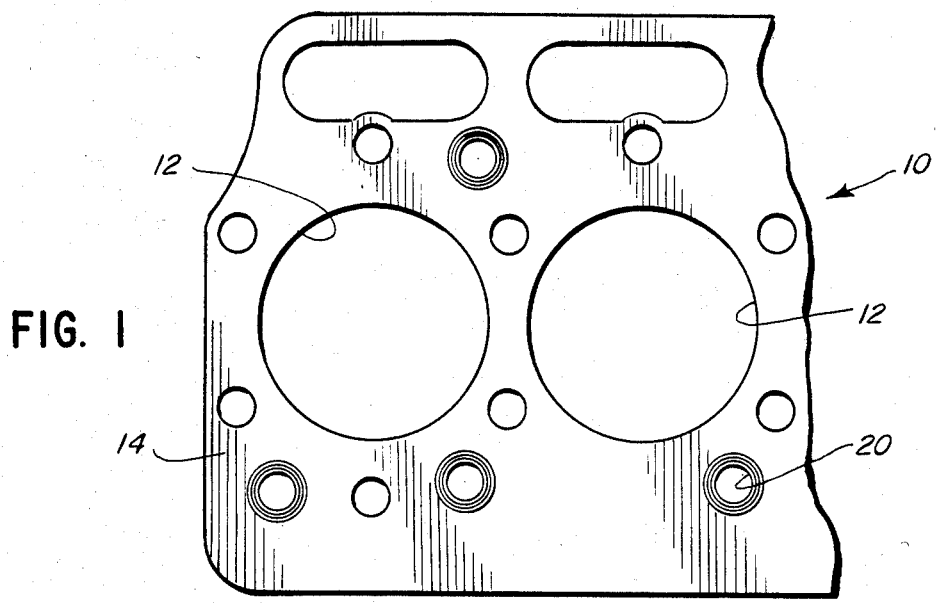
FIG. 1
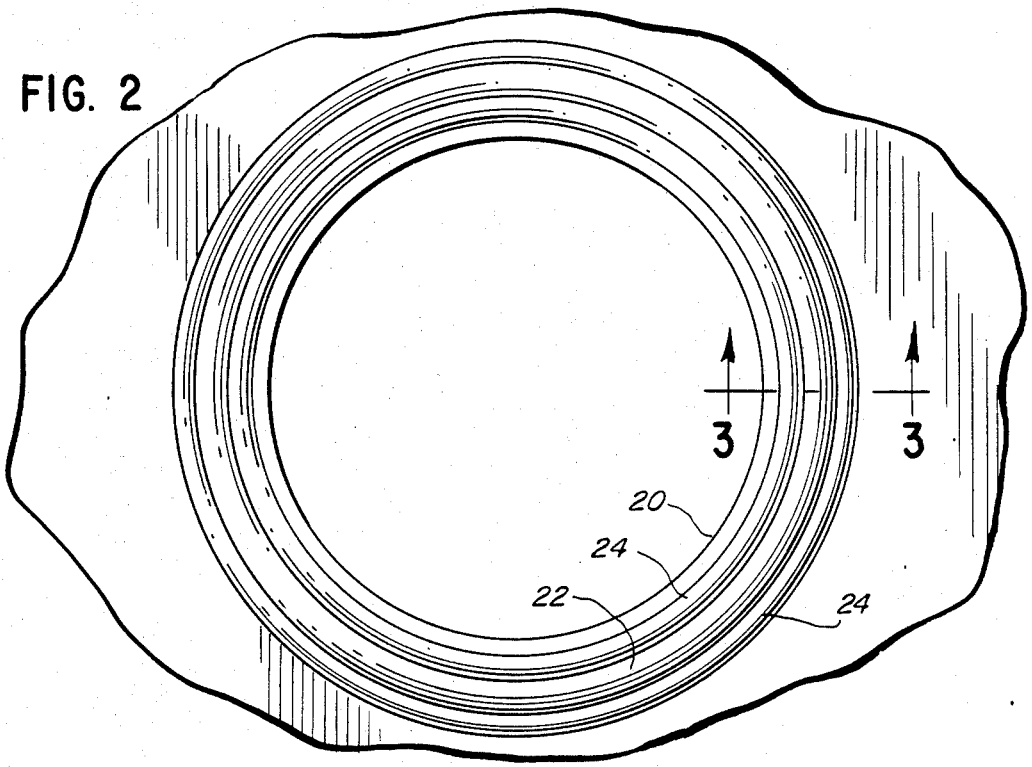
FIG. 2
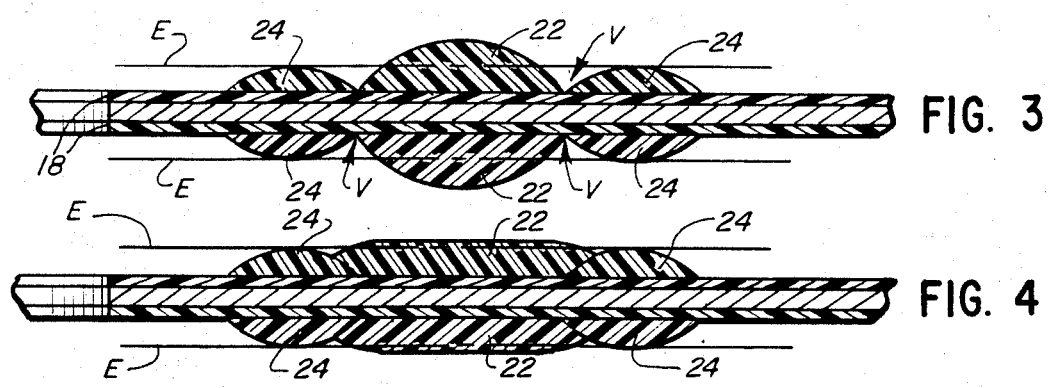
FIG. 3
FIG. 4

SEAL ASSEMBLY HAVING A LOW EXTRUSION RESISTANT ELASTOMERIC SEALING BEAD

BACKGROUND OF THE INVENTION

Seals for a wide variety of uses and purposes have been developed over the years. One of the more effective sealing materials, especially for relatively higher temperature environments, such as in automotive head gaskets where typical elastomers tend to degrade over a period of time, has been silicone rubbers and the like. They are widely used, as by depositing such in printed patterns.

However, there are difficulties in using silicone elastomers in gaskets. These result from their relatively low structural strengths and their low extrusion resistance. As a result, if a silicone seal or bead disposed on a surface is compressed excessively, it may extrude and split, producing leakage paths which result in a loss of its sealing capacity.

In the past, seals of elastomeric materials have been deposited in embossments and the like to confine them under compression. The embossments or other containing configurations generally have been of a volume slightly less than that of the sealing material. Thus, as the sealing material under compression tended to extrude or flow, it would largely be confined by the walls of the embossment or other configuration. Patents showing filled embossments include U.S. Pat. Nos. 3,721,452; 4,397,472; and 4,140,323. German Pat. No. 819,177 and French Pat. No. 1,297,195 are of interest in this regard as well.

However, that mode of preventing destructive extrusion of low extrusion-resistant material beads requires special configurations and does not solve the problem of preventing destructive extrusion of sealing beads which are disposed on the relatively flat surfaces of generally flat gaskets. Thus, in connection with flat gaskets, it has been suggested that hard stops, such as epoxy materials, be applied to the surfaces of gaskets in strategic locations to prevent destructive extrusion of elastomers. U.S. Pat. No. 3,794,333 shows such an approach. However, the utility of that approach is limited to specific types of gaskets and substantially affects the sealing characteristics of the remaining gasket portions.

Thus, improved means for facilitating the use of low extrusion-resistant elastomeric beads is desirable.

SUMMARY OF THE INVENTION

In accordance with the present invention, an improved mechanism for facilitating the use of high temperature and chemical resistant, but low extrusion-resistant, elastomeric beads is provided. To that end, a low extrusion-resistant elastomeric bead is provided on a generally flat, rigid gasket surface, such as on a plastic, metal, or a fiber-elastomer gasket base. Typically, the bead is disposed in a circular or other annular pattern on a flat surface portion surrounding an opening to be sealed.

A pair of high extrusion-resistant elastomeric beads are provided on the gasket surface closely adjacent to the low extrusion-resistant bead, one such bead surrounding the low extrusion-resistant bead and the other such bead lying inside the low extrusion-resistant bead. Thus, the low extrusion-resistant bead, the confined bead, is surrounded by the pair of high extrusion-resistant, straddling beads which are of a lesser height.

The volume of the confined bead above the elevation of the top of the straddling beads is preferably slightly greater than that of the total space between the confined bead and straddling beads at the elevation of the top of the straddling beads, so that as the confined bead deforms and flows in response to compression, it will still extend above the tops of the straddling beads and will thus act as the sealing element among the set of beads.

In this manner, a low extrusion-resistant elastomeric bead may be deposited or disposed on a flat surface, will be protected against destructive compression and extrusion, and will exhibit the sealing capacity for which it is intended and designed. The straddling beads will not interfere with the sealing capacity of the bead or of the remaining portions of the gasket base or other sealing components of the gasket base.

Further objects, features and advantages of the seal assembly of the present invention will become apparent from the following description and drawings.

BRIEF DESCRIPTION OF THE DRAWINGS

FIG. 1 is a plan view of a gasket assembly in accordance with the present invention;

FIG. 2 is an enlarged fragmentary plan view of a portion of the gasket assembly of FIG. 2;

FIG. 3 is an enlarged cross-sectional view taken substantially along line 3—3 of FIG. 2;

FIG. 4 is a view similar to FIG. 3 with the gasket assembly under compression.

DESCRIPTION OF A PRESENTLY PREFERRED EMBODIMENT

Figure 5:
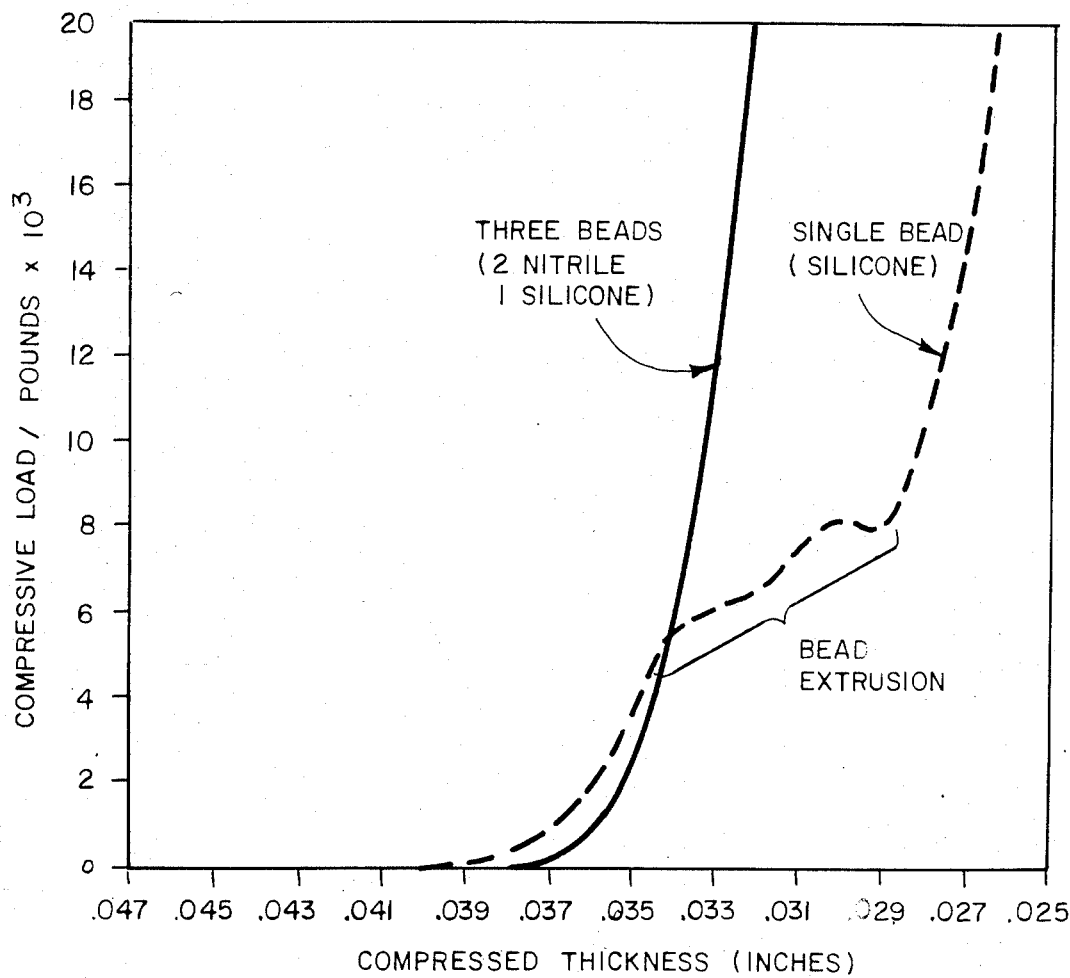
FIG. 5 is a graph showing comparative results of the compression of certain gasket assemblies.

Referring now to the drawings, FIG. 1 illustrates a gasket assembly 10 which may be a head gasket assembly. Gasket assembly 10 comprises at least two combustion openings 12 which may be armored, as in accordance with U.S. Pat. No. 3,565,449, the disclosure of which is here incorporated by reference.

Gasket assembly 10 may comprise a flat gasket base 14, formed as of a plurality of laminated layers, such as a core 16 of metal and a pair of fiber elastomer facing layers 18. Fiber elastomer gasket layers may comprise asbestos or glass fibers or other fibrous material and may utilize nitrile, neoprene, or polyacrylic elastomers as a binder. Other flat gasket bases may be used as well, such as, for example, cold rolled steel, among others.

Gasket assembly 10 defines a plurality of suitable openings, as for oil and water, as well as a plurality of bolt holes for the purposes described in U.S. Pat. No. 3,565,449. The water and oil openings 20 are intended to provide passageways through the gasket assembly 10, but are to be sealed so that water and/or oil will not spread beyond the openings.

To that end, a sealing means is conventionally provided around openings 20. In current practice, an elastomeric bead, such as a silicone bead, is frequently deposited therearound, as by a silk-screening process, to form a sealing bead.

Under some circumstances, the compressive load applied to such a silicone bead, which is of relatively low extrusion resistance, is excessive, resulting in destructive extrusion of the bead. That produces a failure of the gasket assembly by permitting fluid, such as oil or water, to escape.

To preserve the advantages of temperature and chemical resistance of silicone sealing beads, while avoiding the disadvantages of destructive extrusion of such beads, a pair of high extrusion-resistant beads are provided in straddling and confining relationship to the sealing bead of low extrusion resistance. As such, a first annular confined bead 22 of low extrusion resistance is provided. A pair of annular straddling beads 24 of high extrusion resistance, as of nitrile rubber, are positioned in close straddling proximity to the sealing bead 22. Beads 24 are spaced relative to bead 22 such that the total volumes of the spaces V between the confined bead and straddling beads below the tops of the straddling beads 24 is just slightly less than the volume of the bead 22 above the tops of the straddling beads 24. As such, when bead 22 which extends to above the imaginary line connecting the peaks or tops of the second and third higher extrusion-resistant, straddling beads 24 (namely, to above elevation E at the peaks of the beads 24 as seen in FIG. 3) is acted on by a surface positioned to compress it, the incompressible material of bead 22 is displaced and flows into the void spaces V between the bead 22 and the beads 24. When the bead 22 has been deformed as illustrated schematically in the transition from FIG. 3 to FIG. 4, and just before the compressing surface contacts the peaks of beads 24, the void spaces V will be substantially filled. Beads 24 will substantially prevent further displacement of the material of bead 22 and thus, the low extrusion-resistant elastomer of bead 22 will remain as the primary seal and will provide an effective seal between gasket assembly 10 and the confronting compressing surface against which sealing is to take place, all without destructive extrusion of the bead 22.

As such, the seal 22 will continue to display the high temperature and chemical resistance of the silicone material of which it is formed, but without the drawbacks resulting from the low extrusion resistance of the silicone material.

It will also be apparent that when the high extrusion-resistant beads are also of an elastomeric sealing material, they will be capable of providing secondary seals against the escape of fluid from the opening across the surface of the gasket assembly. Thus, under some circumstances, the first sealing bead may be proportioned for very high pressure or load environments to provide for full compression of the sealing bead only after the straddling beads are slightly compressed as well, thereby to provide for sealing not only by the sealing bead, but by the second and third straddling beads as well.

Thus, in accordance with this invention, a gasket assembly having a flat, unembossed surface portion may take advantage of the high temperature and chemical resistance of low extrusion-resistant material deposited as by a silk screening process.

In accordance with the method of this invention, a suitable gasket base 14 with an opening 20 to be sealed is provided. In preferred practice, one or more appropriately configured silk screens are provided through which bead forming material is adapted to be squeezed or forced by conventional silk screening procedures. The gasket surface portion is juxtaposed with a silk screen and a sealing bead 22, as of a low extrusion resistant silicone material, is deposited on the gasket and at least partially cured so that it will not be affected by juxtaposition of a silk screen for the deposit of beads 24. Thereafter, a pair of straddling beads 24 of high extrusion resistant material are deposited in straddling relationship to the silicone bead. The sealing bead 22 is of a height greater than that of the straddling beads 24.

The method therefore comprises the provision of a gasket member defining an opening therein and a substantially flat surface portion around the opening, and the steps of forming a first low extrusion-resistant high-temperature resistant sealing bead on the flat surface portion and circumscribing the opening, forming a second high extrusion-resistant bead on that flat surface portion, circumscribing the opening and lying closely adjacent to the first sealing bead, the first sealing bead being formed with an overall height which is greater than the height of the second bead. The method further comprises the step of forming a third high extrusion-resistant bead on the flat surface portion, and circumscribing the opening, the second and third beads, being positioned to lie closely adjacent to the first sealing bead, each being of a lesser height than the height of the first sealing bead, and being positioned to straddle the first sealing bead, so that when the gasket member is placed under compression, the second and third beads restrict displacement of the first sealing bead to prevent extrusion of the sealing bead.

Further, the beads are deposited in a relationship such that the volumes of the void spaces between the first sealing bead and said second and third beads, respectively, is less than the volume of the first sealing bead which lies above an imaginary line connecting the uppermost edges of the second and third sealing beads, whereby under compression by a compressing surface the flow or displacement of the first sealing bead is confined by the second and third beads and the first sealing bead material remains as the primary seal against the compressing surface.

The shape of the beads, although illustrated as generally arcuate in cross-section in the drawings, may be of any desired shape. And, as illustrated, a set of such beads may be provided on opposite flat surface portions of the gasket assembly as shown in the drawings.

Gaskets in accordance with the present invention have been made and tested. In one instance, condensation cured two-part RTV silicone was deposited on each side of the gasket around a gasket opening by silk-screening and was cured. The finished silicone beads heights were about 0.010 inch, and their widths at the gasket surface were about 0.125 inch. A pair of straddling high extrusion resistant nitrile elastomer beads were deposited on each side by silk-screening and cured. The straddling beads were amine terminated liquid acezlonitrile butadiene cured with epoxy resin. The finished nitrile bead heights were 0.004 inch, and their widths at the surface was about 0.080 inch. The flat gasket surfaces upon which they were deposited was cold rolled steel of a thickness of 0.020 inch. The straddling beads were closely adjacent to the silicone sealing beads.

A second gasket having the same silicone sealing beads on opposite sides of the gasket surface was prepared, but without the straddling high extrusion-resistant beads. Under a clamp load of 5,000 pounds per square inch and hydraulic pressure of 1,000 pounds per square inch, leakage resulted. This appeared to be due to extrusion of the bead due to the excessive compressive load.

However, when the first gasket described was tested under a clamp load of about 6,300 pounds per square inch with an internal static hydraulic pressure of 2,800 pounds per square inch, no leaks were observed after four hours.

When a third gasket, like the gasket of FIG. 3, was prepared, but with spaces of about 0.030 inch between the straddling and sealing beads, and clamped at about 6,000 pounds, the part failed to hold hydraulic fluid at 2,000 psi. This was because the straddling beads failed to back up and control the silicone bead against destructive extrusion.

The comparative results of the tests on the first and second gaskets are to be seen in FIG. 5. There, as the compressive load increases, the silicone beads begin to deform and displace. In the case of the single silicone bead specimen, at about 5,000 pounds, the load bearing capacity of the bead begins to deteriorate and generally flatten, resulting in destructive extrusion of the bead. At this time, leakage paths develop. As the load increases, the bead again begins to display a more upward linear load-bearing character. However, at this point, the sealing capacity of the bead has already been destroyed.

In the case of the first gasket, the three-bead gasket, there is no break in the ascending slope of the performance curve, evidencing lack of destructive extrusion of the silicone gasket. This confirms the pressure test results just referred to.

To form the gasket, silicone material first is deposited through a screen, such as a silk-screen, in a generally conventional manner. A typical silicone rubber which may be used is a condensation cured two-part RTV silicone rubber. After silk-screening, the bead is cured, as by placing the gasket in an oven at an elevated temperature, such as at 300° F. for fifteen minutes.

Thereafter, the gasket is removed from the oven and a pair of beads of a protective, straddling material is deposited through a screen, as by silk-screening, on the gasket base. Preferably, the material is a nitrile rubber, such as an amine terminated acezlonitrile butadiene cured with epoxy resin, and is deposited so that during its deposit it slightly overlaps the side edges of the silicone sealing bead. In one form, the straddling bead material has been deposited to overlap the silicone bead edges by about 0.030 inch. It was determined that during the curing cycle, the nitrile material then flows outwardly until the straddling material just touches the edges of the cured silicone bead, at which time the cross-sectional configuration of the gasket was substantially as shown in FIG. 3, i.e., the straddling and sealing beads were substantially in contact along their adjacent edges. Although some space was observable between them in many places, that space seemed to be on the order of up to 0.005 inch or less, an amount insufficient to affect the control over the compression of the sealing bead by the straddling beads.

It appears that the flow of the overlapped nitrile beads prior to curing may be due to the hydrophobic nature of the silicone sealing bead. It was also observed where the edge of the sealing (silicone) bead was irregular, that a complementary irregularity was usually formed at the edge of the confronting nitrile bead.

When the sealing beads are of the dimensions in the order described, the sealing and straddling beads should be spaced closely adjacent, i.e., less than about 0.005 inch apart to substantially touch. However, it will be apparent that if the sealing bead size and volume should be substantially greater, a slightly greater spacing may be permissible without destroying the character and integrity of the sealing bead when the sealing bead is placed under compression.

Thus, it is clear that a flat surfaced gasket may be provided with sealing beads of low extrusion resistance and may take advantage of the other characteristics of such materials, but without sealing failures due to extrusion by providing auxiliary beads of high extrusion resistance closely adjacent thereto, all without the need for special embossments or other modification of the gasket body itself.

Although but one embodiment of the present invention has been illustrated, it will be apparent to those skilled in the art that modifications and substitutions may be made without depositing from the spirit and scope of the present invention. Accordingly, the invention is intended to embrace all modifications with the scope of the appended claims.

What is claimed is:

1. A gasket assembly comprising a gasket member defining an opening therethrough, said gasket member comprising a substantially flat surface portion around said opening, a low extrusion-resistant elastomeric first sealing bead formed in situ on said one flat surface portion of said gasket member and circumscribing said opening, a high extrusion-resistant second bead of sealing material formed in situ on said one flat surface portion of said gasket member circumscribing said opening, and the edge of said second bead lying closely adjacent to the edge of said first sealing bead, and a high extrusion-resistant third bead of sealing material formed in situ on said one flat surface portion of said gasket member circumscribing said opening, and the edge of said third bead lying closely adjacent to the edge of said first sealing bead, said second and third beads straddling said first sealing bead, said first sealing bead having an overall height which is greater than the heights of said second and third beads, and wherein the volumes of the spaces between said first sealing bead and said second and third beads is less than the volume of the first sealing bead which lies above an imaginary line connecting the uppermost edges of the second and third sealing beads, whereby under compression by a compressing surface, the displacement of the first sealing bead is confined by said second and third beads and the first sealing bead material remains as the primary seal against a compressing surface overlapping adjacent surfaces of said second and third sealing beads and substantially eliminating said spaces, whereby when said gasket member is placed under compression, said second and third beads restrict displacement of said first bead to prevent extrusion of said first sealing bead.

2. A gasket assembly in accordance with claim 1, and wherein said first sealing bead is of a silicone based elastomer.

3. A gasket assembly in accordance with claim 2, and wherein said second and third beads are of a nitrile based elastomer.

4. A gasket assembly in accordance with claim 1, and wherein at least one of said second and third beads are proportioned to provide a secondary seal.

5. A gasket assembly in accordance with claim 1, and wherein first, second, and third beads are disposed on each side of said flat surface portion.

6. A gasket assembly in accordance with claim 1, and wherein the edges of said second and third beads substantially touch the adjacent edges of the first bead.

* * * * *